Figure 4:
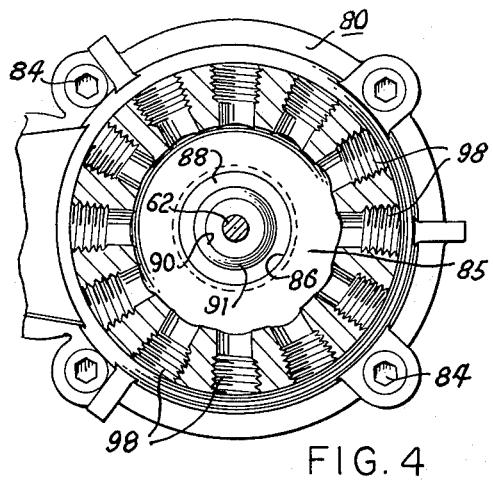

March 16, 1965   J. S. JONES   3,173,448
AMMONIA FLOW REGULATORS
Filed Dec. 14, 1962   2 Sheets-Sheet 1
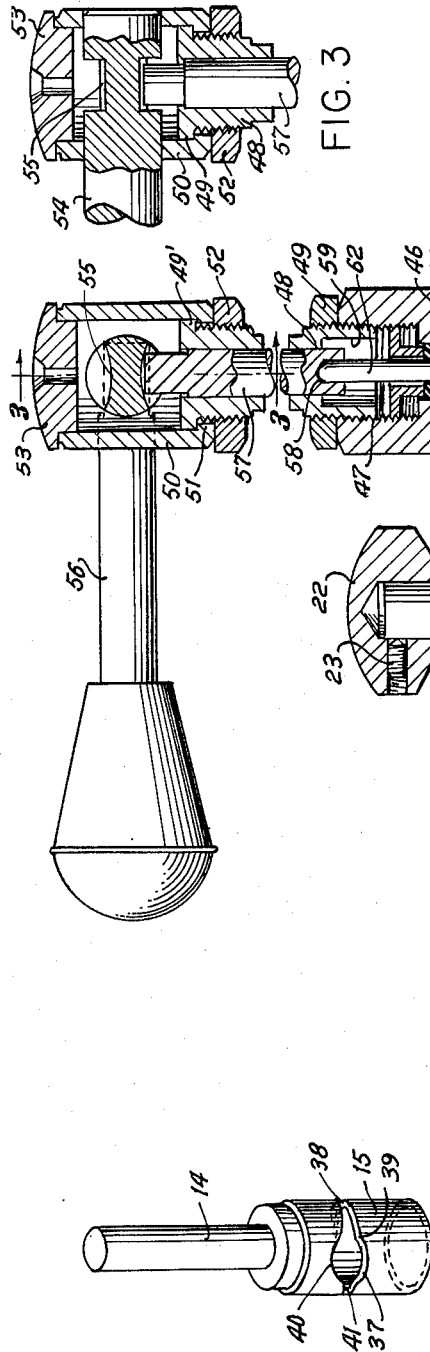
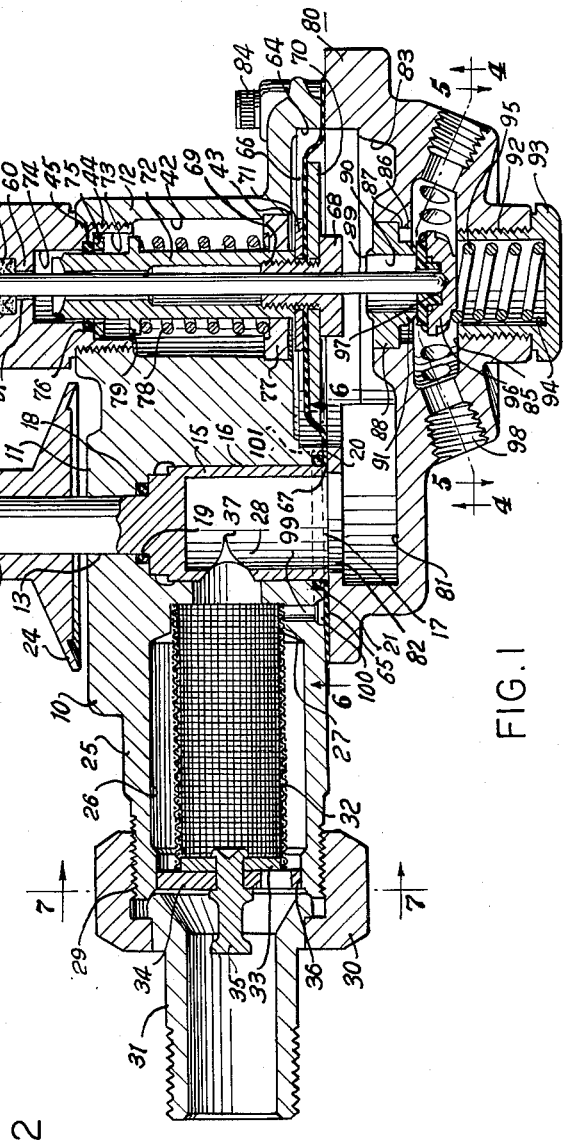
INVENTOR
James S. Jones
BY *Ehley & Ehley*
ATTORNEYS March 16, 1965 J. S. JONES 3,173,448
AMMONIA FLOW REGULATORS
Filed Dec. 14, 1962 2 Sheets-Sheet 2

INVENTOR
James S. Jones
BY *Shley & Shley*
ATTORNEYS

United States Patent Office 3,173,448
Patented Mar. 16, 1965

3,173,448
AMMONIA FLOW REGULATORS
James S. Jones, 130 W. Yorktown, Dallas, Tex.
Filed Dec. 14, 1962, Ser. No. 244,703
1 Claim. (Cl. 137—614.19)

This invention relates to new and useful improvements in ammonia flow regulators.

The invention is particularly concerned with ammonia flow regulators as utilized in agricultural equipment for applying anhydrous or liquified gaseous ammonia to crop areas as a fertilizer.

In the utilization of anhydrous ammonia as a fertilizer in agriculture, it is the practice to apply the ammonia at differing rates in differing areas and with differing crops, and accordingly, the rate of application or rate of flow of the ammonia from the storage vessel, normally mounted upon a tractor or other vehicle, to the multiplicity of applicator knives or nozzles normally employed will depend upon the desired rate of application of the ammonia stated in pounds of nitrogen per acre, the width of the swath over which the ammonia is being applied at any one time, and the speed at which the tractor or other vehicle carrying and transporting the fertilizing equipment is traveling. Normally, a single flow regulator is utilized for the above purposes, all of the ammonia applied from the storage tank being passed through the single regulator and then the controlled flow of ammonia distributed to the individual applicator nozzles or knives from which the anhydrous ammonia is introduced directly into the soil layer. It is known to utilize in the regulator an adjustable metering valve of some type which may be set in accordance with the desired rate of fertilizer application, and to employ therewith a throttling valve which functions primarily to maintain a constant pressure drop across the metering valve and thus ensure the operator of a constant rate of flow regardless of the temperature of the ammonia in the storage tank, the pressure under which the ammonia may be stored and other conditions which may vary from time to time as the ammonia is being applied.

In the past, difficulty has been experienced in providing ammonia flow regulators which will handle both high and low output rates accurately and with relatively exact metering, which will distribute the ammonia uniformly to the applicator nozzles or knives, and which are relatively free of tendencies to clog or lose accuracy due to the presence of foreign matter within the anhydrous ammonia or picked up by the ammonia in its passage through the equipment.

Ammonia, being a refrigerant as well as a fertilizer, undergoes marked cooling upon expansion, and it has also been found in previous flow regulators that undesirable condensation within the regulator manifold occurred as well as uneven heat distribution as between the several outlets to the distributing nozzles or knives, further aggravating the problem of unequal distribution of ammonia as a fertilizer to the several outlets.

It is therefore, an important object of the invention to provide an improved ammonia flow regulator having provision for ensuring equal and uniform distribution of the ammonia fertilizer to the plurality of outlets leading to the applicator nozzles or knives.

A further object of the invention is to provide an improved ammonia flow regulator having a symmetrical manifold chamber from which outlets extend in an equally spaced fashion and into which ammonia flows from a central point for equal discharge and distribution of the fertilizing ammonia through the several outlets; and further, wherein a throttling chamber is symmetrically and axially alined with the manifold chamber for uniform flow and heat distribution.

Yet another object of the invention is to provide an improved ammonia flow regulator having a unique shut-off valve, and operating means therefor functioning also as a guide for a throttling valve and a pressure responsive means associated therewith.

Still another object of the invention is to provide an improved ammonia flow regulator which will properly meter and regulate at low flow rates the passage of "dirty" ammonia, or ammonia containing foreign matter, while maintaining uniform distribution without clogging or partial blocking of the regulator flow passages occurring.

Other and more particular objects will be apparent from a reading of the following description.

A construction designed to carry out the invention will be hereinafter described, together with other features of the invention.

Figure 5:
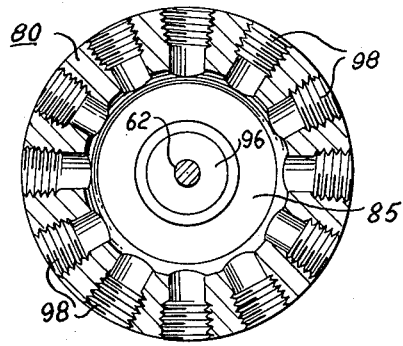
Figure 6:
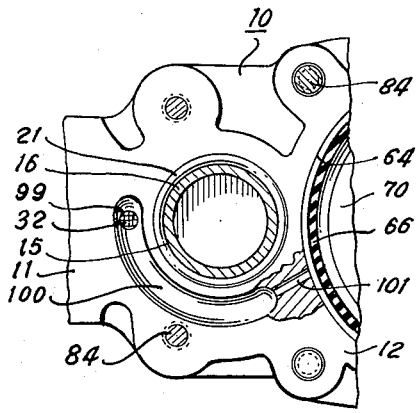
Figure 7:
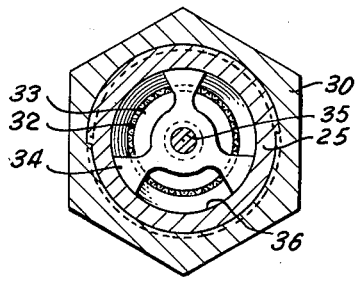

The invention will be more readily understood from a reading of the following specification and by reference to the accompanying drawings wherein an example of the invention is shown, and wherein:

FIG. 1 is a vertical, sectional view of an ammonia flow regulator constructed in accordance with this invention, FIG. 2 is a view in perspective of the metering valve barrel, FIG. 3 is a vertical, transverse, sectional view taken upon the line 3—3 of FIG. 1, FIG. 4 is a horizontal, cross-sectional view taken upon the line 4—4 of FIG. 1, FIG. 5 is a horizontal, cross-sectional view taken upon the line 5—5 of FIG. 1, FIG. 6 is a fragmentary, horizontal, cross-sectional view taken upon the line 6—6 of FIG. 1, and FIG. 7 is a vertical, cross-sectional view taken upon the line 7—7 of FIG. 1.

In the drawings, the numeral 10 designates generally a flow regulator body having an upright, more or less cylindrical metering valve section 11 adjoined in parallel relationship with a more or less cylindrical throttling valve section 12. A cylindrical bore 13 extends vertically and axially within the metering valve section 11 for receiving the shank or stem 14 of a metering valve core having an enlarged barrel portion 15 on its lower end received in an enlarged counterbore 16 opening axially downwardly from the bore 13, the barrel 15 being open at its lower end at 17 and having a snug rotating fit within the counterbore 16. An annular circumferential groove 18 is cut in the lower end of the wall of the bore 13 for receiving a sealing O-ring 19 which engages the lower extremity of the shank 14, and a similar and larger diameter groove 20 is cut in the wall of the lower end of the counterbore 16 for receiving a second sealing O-ring 21 which snugly engages and seals around the outer surface of the lower extremity of the barrel portion 15. An operating knob 22 is secured by a set screw 23 or other suitable means upon the upper portion of the shank 14 which projects upwardly above the metering valve section 11. The knob 22 carries an integral dial flange section 24 overlying the regulator body 10 and displaying suitable indicia (not shown) for indicating the rotational setting of the barrel portion 15 and the rate of ammonia delivery.

A tubular branch member 25 extends horizontally from the metering valve section 11 and has an axial bore 26 opening into the counterbore 16 through a counterbore 27 and a reduced inlet passage 28. The outer end of the branch 25 is externally screwthreaded at 29 to receive a screwthreaded coupling collar 30 for securing an ammonia inlet nipple 31 to the outer end of the branch 25. A relatively coarse straining or screening cylinder 32 has its inner end received within the counterbore 27 and its outer end closed by a transverse plate 33 having secured thereto a spider 34 by a combined handle and brad element 35. The spider 34 has a sliding fit in a reduced cylindrical seat 36 formed in the bore 26 at the outer end thereof so that on removal of the collar 30 and nipple 31, the handle 35 may be grasped for manual removal of the screen 32 for purposes of cleaning the latter. The screen 32 is of smaller outside diameter than the bore 26 and accordingly the flow of incoming ammonia is through the nipple 31, the spider 34 and the bore 26, thence through the screen 32 and into the opening 28.

The opening 28 is circular or cylindrical in configuration, and the metering valve barrel 15 has cut through the side wall thereof in the horizontal plane of the axis of the opening 28 a generally tear-drop shaped opening or slot 37 which, as shown in FIGS. 1 and 2, begins with an elongate V-shaped section 38 of a relatively narrow angularity and extending circumferentially of the barrel 15 clockwise thereof as viewed from the shank 14 to merge through a conversion area 39 into a more or less circular portion 40 having approximately the diameter of the passage 28, it being noted that the walls of the section 40 are inwardly convergent toward the interior of the barrel 15 to provide for a more precise metering function. The cutting of the metering slot 37 necessarily results in the formation of a second V-shaped section 41 again extending clockwise from the substantially circular section 40, but the section 41 is never brought into alinement with the opening 28 and has little, if anything, to do with the metering function. Of course, as the knob 22 is revolved to revolve the metering barrel 15 the portion of the slot or opening 37 brought into alinement with the passage 28 becomes progressively greater in area so that progressively greater flow space for the incoming ammonia, or a flow opening of greater area, is provided.

The throttling valve section 12 is formed with an internal vertical bore 42 having an annular downwardly facing shoulder 43 at its lower end and having its upper end internally screwthreaded at 44 to receive the screwthreaded pin 45 provided upon the lower end of a guide member or bushing 46. The bushing 46 has an internally screwthreaded box 47 in its upper end receiving the screwthreaded lower end of an elongate guide sleeve 48 which carries a lock nut 49 engaging the upper end of the bushing 46. The upper end of the guide sleeve 48 has an external annular flange 49' confined within a hollow cylindrical housing 50 having an internal annular flange 51 at its lower end abutted by the flange 49'. A lock nut 52 on the sleeve 48 abuts the lower end of the housing 50, and a press-fit plug 53 closes the upper end of the housing. A transverse shaft 54 is trunnioned diametrically across the interior of the housing 50, being cammed at 55 within the housing 50 in alinement with the vertical axis thereof and carrying a laterally projecting handle 56 externally of the housing 50 by which the shaft 54 may be rotated about its axis. The sleeve 48 is tubular and receives an elongate push pin 57 in reciprocal relationship, the pin 57 having an axial upwardly extending socket 58 in its lower end disposed within a counterbore 59 provided in the lower end of the sleeve 48.

The bushing 46 carries in its medial portion a transverse web 60 having an axial vertical passage 61 through which an elongate push rod 62 extends. A counterbore is provided above the web 60 to constitute a packing gland 63, the rod 62 extending upwardly through the packing gland, and being sealed off thereby, and having its upper end received within the socket 58 in the lower end of the pin 57.

A diaphragm or pressure-responsive member and throttling valve assembly is slidably mounted upon the lower portion of the rod 62 within a shallow, circular, downwardly facing recess 64 axially alined with the bore 42 and opening downwardly therefrom. A sealing gasket 65 extends across the entire underside of the body 10, having a portion 66 extending across the recess 64 and forming a pressure-responsive means or diaphragm therein. An opening 67 in the gasket 65 underlies and registers with the counterbore 16 of the metering valve.

A tubular throttling valve disk or core 68 underlies the diaphragm 66 and has an upstanding screwthreaded shank 69 extending upwardly through a wide, circular pressure disk 70, the center of the diaphragm 66, and an upper pressure disk 71 overlying the central portion of the diaphragm. A tubular throttling valve shank 72 has its screwthreaded lower end engaging the pin 69 to clamp the diaphragm 66 between the plates 70 and 71 and extends upwardly in the bore 42 through a counterbore 73 formed in the lower end of the guide bushing 46 and into an enlarged bore 74 underlying the web 60. A press-fit ring 75 in the counterbore 73 confines an O-ring seal 76 in the lower end of the bore 74 around the shank 72 to form a seal with the exterior thereof. A circular disk 77 has a press-fit against the shoulder 43 in the lower end of the bore 42, and a compression spring 78 is confined between the upper side of the disk 77 and an external, annular flange 79 on the upper portion of the shank 72 so as to urge the shank along with the diaphragm 66 and the throttling valve core 68 constantly upwardly.

A closure plate 80 underlies the metering valve section 11 and the throttling valve section 12 and is formed with a transverse passage 81 leading from an opening 82 in its upper side underlying the opening 67 in the gasket 65 and the open lower end of the metering valve barrel 15 to a diaphragm or throttling chamber 83 underlying the diaphragm 66 and in alinement and registry with the recess 64. The recess 64 and the chamber 83 are circular, so as to enclose a circular portion of the diaphragm 66, and are also symmetrical with respect to the vertical axis of the throttling valve core 68. The closure plate 80 is secured to the regulator valve body by suitable bolts 84 or any other suitable or desirable means.

An annular or circular manifold chamber 85 is formed in the closure plate 80 beneath the throttling chamber 83 and in axial alinement therewith, the manifold chamber 85 having a generally frusto-conical configuration. A circular opening 86 communicates upwardly from the manifold chamber 85 to the throttling chamber 83, having its upper end counterbored to form an upwardly facing annular shoulder 87 upon which a circular or cylindrical ammonia passage or flow member 88 has a press fit. A throttling valve seat 89 is formed upon the upper end of the axial passage 90 through the member 88 and is adapted to cooperate with the throttling valve core 68 for throttling the flow of ammonia through the passage 90. A shut-off valve seat 91 is also formed on the lower end of the passage 90 facing the manifold chamber 85. A screwthreaded opening 92 extends axially downwardly from the manifold chamber 85 and receives a closure plug 93 having an axial upwardly opening recess 94 receiving a coiled compression spring 95. A shut-off valve core 96 is carried upon the upper end of the spring 95 and is constantly urged thereby toward the valve seat 91. The valve core 96 has a central socket 97 within which the lower end of the push rod 62 is received, the intermediate portion of the push rod having freely-sliding and guiding engagement with the pin 69 and valve core 68 as well as the upper portion of the thrust sleeve 72. A plurality of ammonia distribution passages 98, their outer ends being screwthreaded, open more or less radially from the exterior of the closure plate 80 into the interior of the manifold chamber 85, it being noted as shown in FIGS. 4 and 5, that the openings 98 are of equal size and are equally spaced circumferentially around the walls of the chamber 85 both with respect to each other and with respect to the ammonia flow passage 90.

Thus, the manifold chamber 85, the distribution passages 98, the flow passage 90, the valve seats 89 and 91, the valve core 68, the throttling chamber 83, and the diaphragm 66 are all symmetrically disposed about the longitudinal axis of the rod 62, and in particular, the throttling chamber and manifold chamber 85 are symmetrically alined and disposed about the central axis.

For communicating the pressure of the ammonia upstream of the metering valve to the upper side of the diaphragm 66 a port 99 is drilled from the counterbore 27 latterally to the underside of the regulator body 10 and opens into a semi-circular groove 100 which partially encircles the lower end of the counterbore 16, as shown in FIG. 6, and terminates in a port 101 extending from the groove 100 into the recess 64. Thus, the underside of the diaphragm 56 is exposed to the pressure of the ammonia downstream of the metering valve, while the upper side of the diaphragm is exposed to the pressure existent within the strainer 32 upstream of the metering valve.

In the operation of the ammonia flow regulator, the ammonia supply tank or reservoir (not shown), which is normally a pressure vessel having a capacity of fifty gallons or so of liquid anhydrous ammonia is connected by suitable hosing or other means to the inlet nipple 31, but at this point, no flow takes place because the shut-off valve core 96 is in engagement with the shut-off valve seat 91 due to the position of the handle 56 as shown in FIG. 1. Further, since under static conditions, the pressure on both sides of the diaphragm 66 will be equal, the spring 78 will be functioning to hold the throttling valve core 68 elevated at its highest position above the throttling valve seat 89, also as shown in FIG. 1.

Now, when the handle 56 is raised vertically through an angle of 90°, the cam section 55 will function to force the pin 57 and rod 62 downwardly, thus compressing the spring 95 and forcing the shut-off valve core 96 downwardly away from the shut-off valve seat 91 so that flow of ammonia may commence. The metering valve barrel 15 will be set at a preselected point to expose the desired area of flow opening through the slot 37 to the inlet passage 28, and the ammonia will at least partially vaporize in flowing through the slot, pass downwardly through the interior of the metering valve 15 into the passage 81 and thence into the throttling chamber 83. The spring 78 functions to maintain a predetermined pressure differential across the diaphragm 66, usually a differential of some seven or eight pounds per square inch so that the pressure within the throttling chamber 83 will be some seven pounds per square inch less than the pressure within the recess 64 which, of course, is the pressure upstream of the metering valve within the strainer 32. Accordingly, the constant pressure drop across the metering valve will be maintained and a constant weight of ammonia will pass therethrough, the diaphragm 66 and spring 78 functioning to maintain this constant rate of flow.

The ammonia will be fully atomized by the time it passes through the flow member 90 into the manifold chamber 85, and will be introduced into the latter in its central portion in an axial fashion and will flow uniformly to the plurality of distribution outlet openings 98 from which suitable conductors such as flexible hoses (not shown) extend to the several applicator nozzles or knives. The distribution openings 98 being entirely symmetrical and equally spaced with respect to each other and with respect to the passage 90, the manifold chamber 85 being axially alined and symmetrical with respect to the throttling chamber 83, and both being axially alined and entirely symmetrical with respect to the diaphragm 66, the recess 64, the throttling valve core 68 and the throttling valve seat 89, will result in even and uniform distribution of flow to all of the openings 98 and the even and uniform distribution of all chilling or transfer of heat which takes place due to the vaporization of the ammonia. The valve core 68 and the diaphragm 66 along with their connected and related structures, are securely centered and guided by the pin 62 and held at all times in symmetrical relationship with respect to the longitudinal axis thereof. The rate of ammonia flow may be varied, of course, at will by shifting the position of the metering valve barrel 15, and the selected rate of flow maintained at a uniform rate.

The screen 32 may be of relatively coarse mesh since the slot 37 of the metering valve is not subject to clogging even at low flow rates by foreign material which may be present in the ammonia or which may be picked up by ammonia in its passage through the apparatus, and all potential points of stoppage or blocking of the regulator have been eliminated. The various seals such as the O-rings 19 and 21 and the O-ring 76 along with the packing gland 63 are isolated from the flowing ammonia so as to be protected against any accumulation of foreign matter therefrom as well as to be protected from the temperature drops ensuing from the expansion of the liquid ammonia into the vapor state.

As noted hereinbefore, ammonia, being a refrigerant as well as a fertilizer, undergoes a marked cooling upon expansion. The energy released in dropping the temperature of the liquid ammonia is consumed by converting a certain percent of the liquid into a vapor. Disregarding heat from other sources, a drop in pressure from 90 to 0 pounds per square inch gauge will convert about 20% of the liquid into a vapor, but the 20% vapor will occupy about 99% of the space. When the expansion of the liquid ammonia takes place through an elongate narrow slot like the periphery of a valve the liquid becomes well atomized. In the present structure, the compact symmetrical manifold 83 provides less obstruction and less internal surface for the atomized ammonia to condense on, thereby allowing the metered ammonia to be divided while it is still atomized, and thereby affording a more uniform distribution. The manifold 83 being circular and flat in shape, a high percentage of the external surface is on the top and bottom. The bottom and sides of the manifold chamber are exposed to the atmosphere, the top being exposed to metered liquid ammonia, thereby allowing the heat flow into the manifold to be equally distributed from outlet to outlet and thereby eliminating unsymmetrical hot spots, and cold spots that greatly effect the distribution at low output rates of ammonia.

It is also pointed out that the throttling valve is properly balanced. When the quick shut-off valve 96 is closed, the ammonia system pressure communicates around stem 62 into chamber 74 whereby seal 63 becomes a static seal against system pressure; but when the quick-shut-off valve 96 is opened and a flow of ammonia induced through passage 90 in valve seat 88 the flow becomes throttled by valve 68 and seat face 89. Then chamber 74 becomes exposed to the pressure in manifold 85, and seal 76 seals chamber 74 from chamber 42. The area of the upper portion of stem 72 equals the area of seat opening 90 thereby balancing the throttling means not only for system pressure but also the pressure change in the manifold.

The foregoing description of the invention is explanatory thereof and various changes in the size, shape and materials, as well as in the details of the illustrated construction may be made, within the scope of the appended claim, without departing from the spirit of the invention.

What I claim and desire to secure by Letters Patent is:

An ammonia flow regulator including a regulator body, an adjustable metering valve in the regulator body for establishing in the regulator body an ammonia flow opening of a selected area, an ammonia inlet to the metering valve, the regulator body having therein a throttling chamber in communication with the flow opening of the metering valve, a pressure-responsive means in the regulator body having one side exposed to the ammonia inlet and the other side exposed to the throttling chamber, resilient means constantly urging the pressure-responsive means away from the throttling chamber, the regulator body having a circular depending manifold chamber, an annular ammonia flow member having a circular valve seat exposed to the throttling chamber and an outlet opening axially into the manifold chamber, the manifold chamber having a plurality of ammonia discharge outlets of equal size spaced equally around the periphery of the manifold chamber and spaced equally from the ammonia flow member outlet, a throttling valve mounted for movement toward and away from the valve seat by the pressure-responsive member, the ammonia flow member having a second valve seat on its outlet, a shut-off valve core in the manifold chamber, an elongate rod extending axially of the ammonia flow member and engaging the shut-off valve core, and means for reciprocating the rod lengthwise to move the shut-off valve core toward and away from the second valve seat, the pressure-responsive means carrying the throttling valve, and the pressure-responsive means and the throttling valve including aperture means so as to be slidably mounted on the rod.

References Cited by the Examiner
UNITED STATES PATENTS

| | | | |
|---|---|---|---|
| 2,084,755 | 6/37 | Young | 137—561.1 |
| 2,144,898 | 1/39 | Shrode | 137—501 XR |
| 2,557,955 | 6/51 | Ewing | 137—525 |
| 2,807,144 | 9/57 | St. Clair | 137—501 XR |
| 2,915,084 | 12/59 | Taylor et al. | 137—501 |

M. CARY NELSON, *Primary Examiner.*

M. P. SCHWADRON, *Examiner.*